United States Patent
Diouf et al.

(10) Patent No.: US 11,342,808 B2
(45) Date of Patent: May 24, 2022

(54) WELL DAMPED OR CRITICALLY DAMPED MOTOR

(71) Applicant: ABB Schweiz AG, Baden (CH)

(72) Inventors: Papa M. Diouf, Gastonia, NC (US); Wayne Paschall, Maiden, NC (US); Bryan K. Oakes, Bostic, NC (US); Gregory G. Zemaitis, Gastonia, NC (US)

(73) Assignee: ABB Schweiz AG, Baden (CH)

( * ) Notice: Subject to any disclaimer, the term of this patent is extended or adjusted under 35 U.S.C. 154(b) by 92 days.

(21) Appl. No.: 15/931,815

(22) Filed: May 14, 2020

(65) Prior Publication Data
US 2021/0359574 A1    Nov. 18, 2021

(51) Int. Cl.
*H02K 5/24*  (2006.01)
*H02K 5/15*  (2006.01)
*H02K 5/173* (2006.01)
*H02K 7/00*  (2006.01)
*H02K 9/06*  (2006.01)

(52) U.S. Cl.
CPC .............. *H02K 5/24* (2013.01); *H02K 5/15* (2013.01); *H02K 5/1732* (2013.01); *H02K 7/003* (2013.01); *H02K 9/06* (2013.01)

(58) Field of Classification Search
CPC .......... H02K 5/24; H02K 5/15; H02K 5/1732; H02K 7/003; H02K 9/06
USPC ................................................. 310/40 R, 90
See application file for complete search history.

(56) References Cited

U.S. PATENT DOCUMENTS

| | | | |
|---|---|---|---|
| 2005/0067918 A1* | 3/2005 | Holter | H02K 7/003 |
| | | | 310/261.1 |
| 2017/0170755 A1* | 6/2017 | Okamoto | H02P 6/04 |

FOREIGN PATENT DOCUMENTS

| | | |
|---|---|---|
| CN | 106100220 A | 11/2016 |
| EP | 2626979 A1 | 8/2013 |
| JP | 53-127607 A | 11/1978 |

OTHER PUBLICATIONS

European Patent Office, International Search Report in International Patent Application No. PCT/IB2021/053351, 4 pp. (dated Jul. 13, 2021).

European Patent Office, Written Opinion in International Patent Application No. PCT/IB2021/053351, 7 pp. (dated Jul. 13, 2021).

* cited by examiner

*Primary Examiner* — Terrance L Kenerly
(74) *Attorney, Agent, or Firm* — Leydig, Voit & Mayer, Ltd.

(57) ABSTRACT

A motor includes a housing, a stator assembly disposed in the housing, the stator assembly defining a rotor cavity extending through the housing, a rotor assembly including a rotor shaft extending along a longitudinal axis, two brackets connected to the housing, the two brackets disposed, one each, at either end of the rotor cavity, and two bearings disposed, one each, on each of the two brackets, wherein the two bearings rotatably support the rotor shaft within the housing. The rotor shaft is a stepped shaft that includes end portions disposed at either end of a core portion, the core portion includes channels extending in a direction parallel to the longitudinal axis, the channels extending radially at a depth into the core portion to define a core diameter such that the core diameter is less than the first diameter.

18 Claims, 7 Drawing Sheets

WELL DAMPED OR CRITICALLY DAMPED MOTOR

FIELD OF THE DISCLOSURE

The present disclosure relates to rotating machines and, more particularly, to large electric motors.

BACKGROUND OF THE INVENTION

Large motors for use in industrial applications such as a National Electrical Manufacturers Association (NEMA) 6800 frame-size motor, may typically operate using alternating current (AC), 3-phase electrical power to produce up to, or more than, 4000 HP. Such motors are commonly used for marine and land applications in the chemical, oil and gas industries, in mining applications, in paper and forest industrial application, in water and wastewater facilities, and the like. Large motors of this type can be used to operate gas compressors, liquid pumps & extruders, condensers, blowers, chippers, refiners, grinders and the like. Often, they can also be used in electrical motor/generator applications as well.

As is known, rotors are classified into two groups (rigid or flexible) depending on the relationship between the rotating speed (RPM) of the rotor and its natural frequency. When the natural frequency of some part of a machine is also equal to the rotating speed or some other exciting frequency of vibration, there is a condition of resonance. The rotating speed at which the rotor itself goes into bending resonance is called a "critical speed." As a general rule, rotors that operate below 70% of their critical speed are considered rigid and, when balanced at one speed will be balanced at any other normal operating speed below 70% of its critical speed. Flexible rotors are rotors that operate above 70% of their critical speed and will bend or flex due to the forces of unbalance.

Motors of the type can typically operate at speeds up to 3600 revolutions per minute (RPM). Their design includes a two pole AC machine that can operate with low vibration levels up to a maximum rated speed. Two pole motors in this frame size employ a so-called flexible rotor design. For motor applications requiring operation within a wide range, of speeds, which could include operation around the critical speed of the motor, the speed of the motor may be limited or blocked out for a range of speeds that fall within a predefined range around the critical speed, which may limit the functionality of the motor. Further, a flexible rotor balanced at one operating speed may not be balanced when operating at a different operating speed. This can result in unbalance because as the rotor bends or deflects, the weight of the rotor is moved out away from the rotating centerline creating a new unbalanced condition, known as whip. This new unbalance can be corrected by re-balancing in the two end planes; however, the rotor would then be out of balance at slower speeds where there is no deflection. The only solution to ensure smooth operation at all speeds is to make the balance corrections in the actual planes of unbalance, which is practically impossible. Typical machines which contain flexible rotors are steam and gas turbines, multistage centrifugal pumps, compressors, and paper rolls.

In general, motors of the type will typically have their first rotor critical speed below the operating speed of 3600 revolutions per minute. These motors, therefore, are not able to operate in the entire speed range without a blocked-out range, typically +/−5 to 10% of the rotor critical speed. Accordingly, it is desirable to have motors that have use of their entire operating speed without vibrations.

BRIEF SUMMARY OF THE INVENTION

In one aspect, the disclosure describes a housing, a stator assembly disposed in the housing, the stator assembly defining a rotor cavity extending through the housing, a rotor assembly including a rotor shaft extending along a longitudinal axis, two brackets connected to the housing, the two brackets disposed, one each, at either end of the rotor cavity, and two bearings disposed, one each, on each of the two brackets, wherein the two bearings rotatably support the rotor shaft within the housing.

In one embodiment, the rotor shaft is a stepped shaft that includes end portions disposed at either end of a core portion, the end portions being generally cylindrical at a first diameter, core portion having a generally cylindrical shape defined at a second diameter, wherein the core portion includes channels extending in a direction parallel to the longitudinal axis, the channels extending radially at a depth into the core portion to define a core diameter; and wherein the core diameter is less than the first diameter.

BRIEF DESCRIPTION OF THE SEVERAL VIEWS OF THE DRAWING(S)

DETAILED DESCRIPTION

Figure 1:
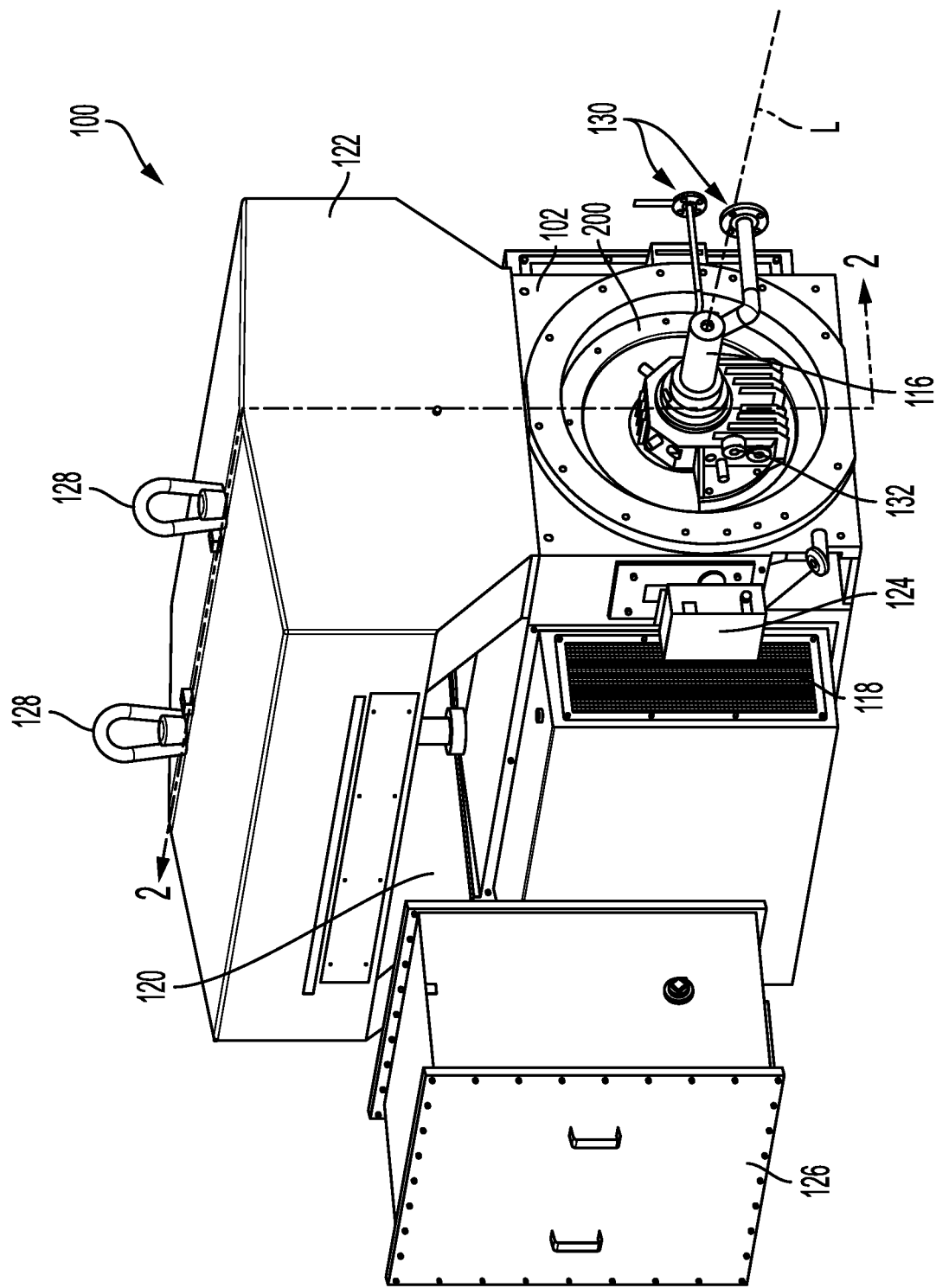
FIG. 1 is an outline view of a motor in accordance with the disclosure.

The present disclosure is applicable to motors having flexible shafts, which are damped such that excessive vibration is avoided over the entire operating range of the motor with respect to rotor speeds. More specifically, the present disclosure describes systems and methods for damping rotor vibration such that resonance frequencies of the flexible rotor are pushed beyond the maximum rotor shaft speed. As a consequence, and advantage, the new systems and methods for creating and using a stiffer rotor permit motor operation without a block out range in the entire speed range and without high vibration. The rotor first critical speed is above the operating speed of 3600 revolutions per minute. A state of the art bracket design, a new shaft configuration, and a new manufacturing process were implemented on this new design. The improved design allows operation of the motor at any speed from zero to 3600 revolutions per minute without experiencing violent vibration.

In the past, flexible rotor designs had their first rotor bending mode below the maximum operating speed of the motor. In flexible rotor applications, the motor could not operate at any desirable speed on variable frequency drive throughout the entire speed range. A flexible rotor design would require a speed block-out range near the rotor first bending mode, or if ran near the critical speed would experience higher vibration level that will reduce the service life and cause failures in various motor components such as the bearings or damage to the rotor itself. Amplification factors greater than 10 are typical in flexible rotor design, which indicate that the rotor vibration during operation near a critical speed could be considerable. Due to the length of the frame and the ratings that are usually designed into larger motors such as the NEMA 6800 frame size motors, or larger, the distance between motor bearings at either end of the rotor was one of the challenges in making such rotors rigid for these large frame size motors.

Moreover, because the motors of this type are open to permit airflow for cooling through and around the rotor, adding structures to stiffen the motor cage externally is not easily accomplished and can only have a limited effect in stiffening the rotor, for the reasons discussed above. Particularly, air passages formed within the rotor, which promote air circulation for cooling that extend through the rotor and out from the radial ducts in the stator to dissipate heat generated by the motor present additional challenges in making the shaft rigid.

This design consists of a two pole AC machine that can operate at any speed within the range with low vibration levels up to 3600 revolutions per minute without a block out speed range. The first and second bending modes (lateral critical speed) of the rotor are located at 25% above the design speed of 3600 revolutions per minute. The first bearing/housing critical speed is well damped or critically damped with an amplification factor of less than 2.5, this means the motor can operate at or near the critical speed without high vibration amplitudes. The amplification factor is a measure of a rotor bearing system's vibration sensitivity to unbalance when operating near its lateral critical speeds. The amplification factor is calculated using the half power method from the bode plot of the rotor damped unbalance response analysis and/or the shop test data.

The present disclosure describes systems, structures and methods for increasing stiffness and also damping of rotors for large motors, which can reduce or eliminate first and second order vibrations from within the motor's operating range. Advantageously, these structures can be installed to retrofit existing motor cages and stators. In one embodiment, the desirable rotor stiffening effects were achieved by implementing one or more features, including a reduction in the bearing span (or bearing to bearing centers) by utilizing a new bracket design, increasing rotor core stiffness while still maintaining air flow for cooling through axial channels of the rotor shaft, designing a "spider" shaft with provision for balancing, and others.

The reduction in bearing span is accomplished by new brackets that reduce the span between bearings on the rotor, thus shortening the length of the rotor that is suspended between the bearings to increase its natural vibration frequency. The improved stator brackets in accordance with the disclosure are frusto-conical in shape, like a "volcano," which allows a DIN-style center flange bearing to be mounted and contained in the bracket. The design of the bracket is also stiffened to make a bracket that is rigid enough to increase the motor frame system stiffness. When the oil film stiffness is present during operation, the overall equivalent stiffness of the system increases. The bearing centers are also in closer alignment with the motor frame feet, which reduces overall elasticity of the motor assembly. The bearing load is also brought into a direct line to the motor frame foot, which increases the system's stiffness.

In addition, the core stiffness of the rotor shaft is increased while maintaining the air flow requirement. In one embodiment, the shaft diameter through the rotor core is 9 inches and includes twelve identical grooves, which are machined integrally with the shaft along the shaft core body. The shaft core diameter at the root of the groove is 6 inches in diameter. Radii of ¾ of an inch are machined at the bottom of the groove. A cross section of the shaft core body will reveal six "spider arm" that are 1.5 inches thick. The grooves along the axis of the shaft are connected via a ring at the center of the shaft. The shaft diameter outside the core body is 6.5 inches, it is larger than the root diameter of the shaft which 6.0 inches, causing a dip that will create an acceleration of the air as it enters the grooves. The interference fit between the shaft and the rotor core is optimized to increase the effective stiffness of the rotor system.

For rotationally balancing the rotor, provision for balance weights is provided. In one embodiment, two holes are drilled and/or tapped at each end of the spider arm. Balance weights can be added on the rotor via these holes by bolting. Such balancing weight installation avoids welding of the balance weight on the shaft, which may otherwise locally alter the crystalline structure of the rotor steel material.

Other improvements are also implemented to improve the material properties of the rotor material. For example, the rotor and shaft are supported vertically after assembly and covered with a thermal blanket to slowly cool to room temperature. This process reduces the residual stresses and maintain the straightness throughout the process.

Figure 2:
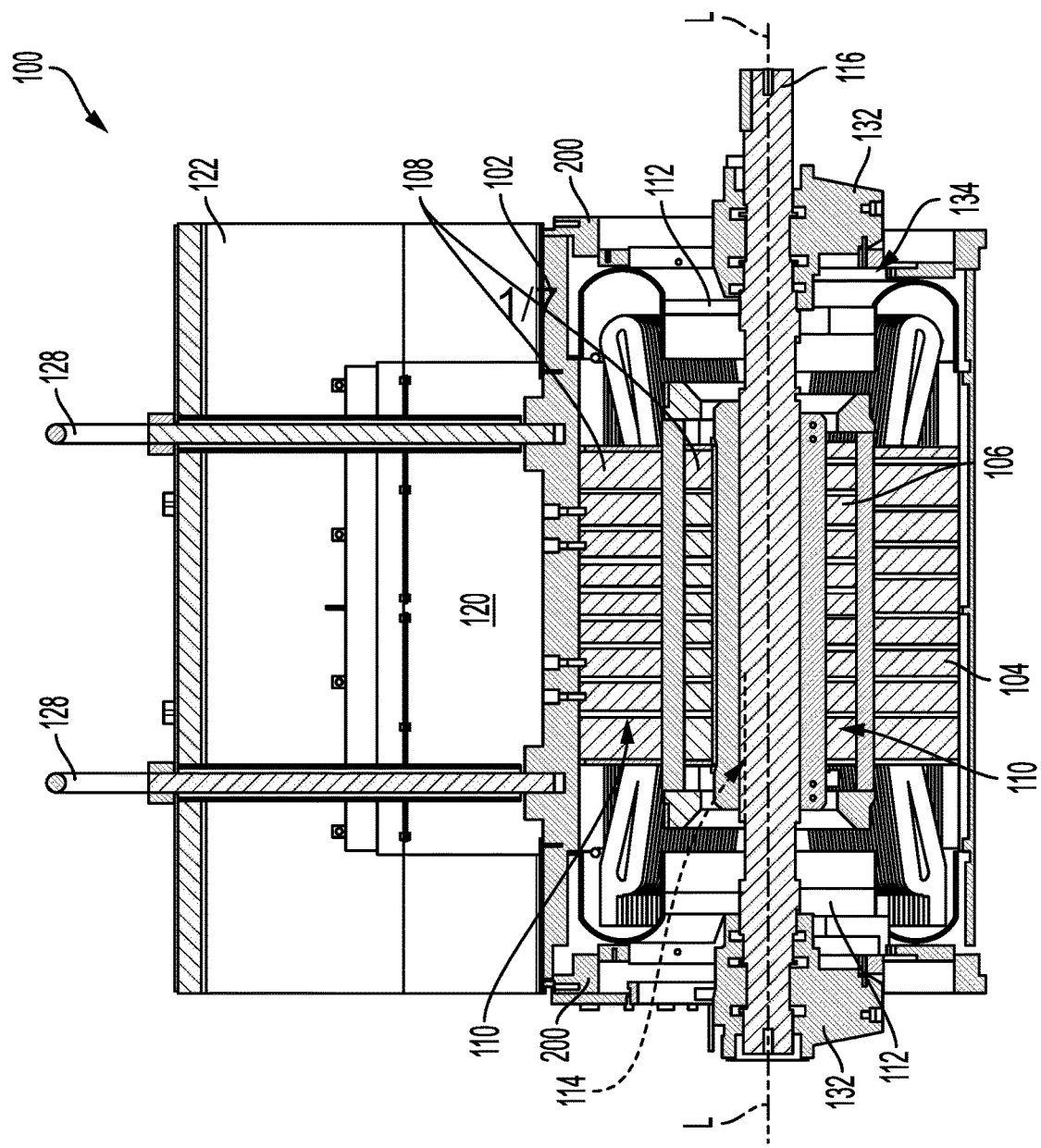
FIG. 2 is a section view of the motor show in FIG. 1.
Figure 3:
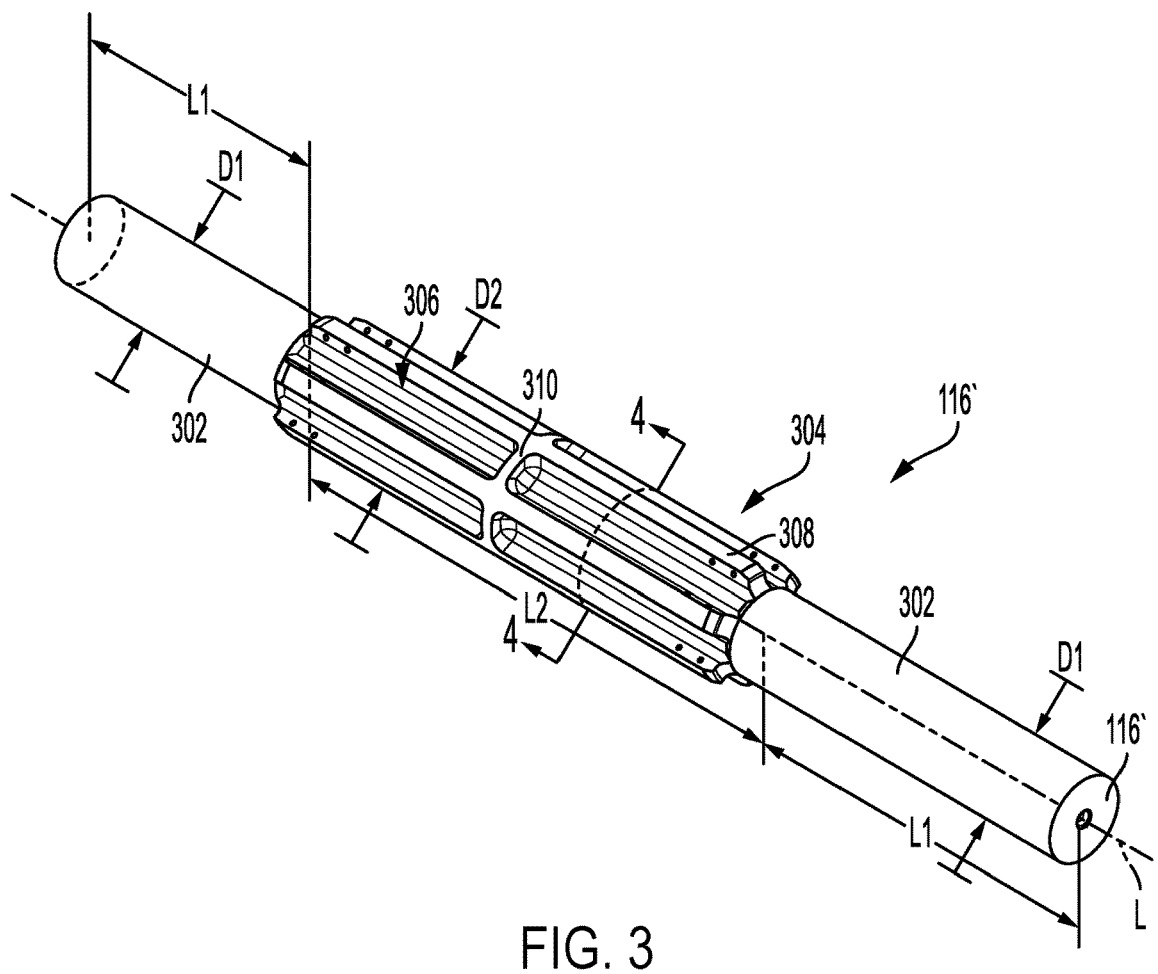
FIG. 3 is an outline view of a motor shaft in accordance with the disclosure.

An outline view of a motor 100 in accordance with the disclosure is shown in FIG. 1, and a section through the motor 100 is shown in FIG. 2. In reference to these figures, the motor 100 may be a NEMA 6800 frame-size motor and includes a housing 102 that surrounds a stator assembly 104 and a rotor assembly 106. The stator and rotor assemblies, depending on the type of motor, can include magnetic materials such as magnets, coils, ferromagnetic or magnetic core materials, binding materials and the like, as is known, which are generally denoted as materials 108. Air channels 110 are formed through the rotor and stator materials 108 to promote a cooling airflow, which is driven by centrifugal forces while the motor is operating. Fans 112 pull air into the interior of the motor 100, which passes through channels 114 formed in a rotor shaft 116. The channels 114 are fluidly communicating with the air channels 110.

Rotation of the rotor assembly 106 causes a centrifugal force that circulates the air flow through the rotor and stator materials 108 to provide cooling. Overall, the cooling airflow enters the motor 100 through inlets formed in a top enclosure 122, passes through to cool internal motor structures, and exits through an exhaust 118 that is attached to motor frame 102 of the motor 100. Additional components such as an electrical lead connection housing 124, motor controller housing 126, and lifting eyes 128 may be attached to the motor housing 102. Additional external connections include oil connections 130 for bearings 132 that support the rotor shaft 116, During operation, the rotor shaft 116 and the remaining structures of the rotor assembly 106 that are attached to the rotor shaft 116 are rotatably supported in the housing 102 on two bearings 132, which are disposed, one each, on either end of a rotor cavity 134 that is defined within the housing 102. The rotor cavity 134 is a generally cylindrical opening that extends along a longitudinal axis, L, of the rotor shaft 116. The rotor cavity 134 extends radially from the axis L to the stator assembly 104, and axially between the two bearings 132. Each bearing can include a hydrodynamic oil bearing arrangement that supports, lubricates and dampens vibration of the rotor assembly 106 during operation. Oil is circulated within the bearings 132 and around portions of the rotor shaft 116 during operation, and is provided through the oil connections 130 or by self-lubrication internally by oil rings (not shown). The bearings 132 are supported on the housing 102 by use of brackets 200, which are disposed on the housing 102 at either end of the rotor cavity 134.

Figure 4:
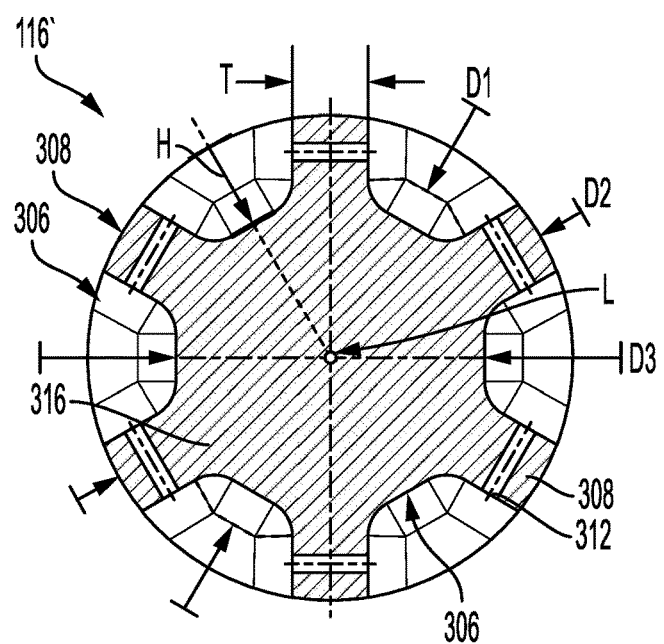
FIG. 4 is a cross section through the shaft of FIG. 3.
Figure 5:
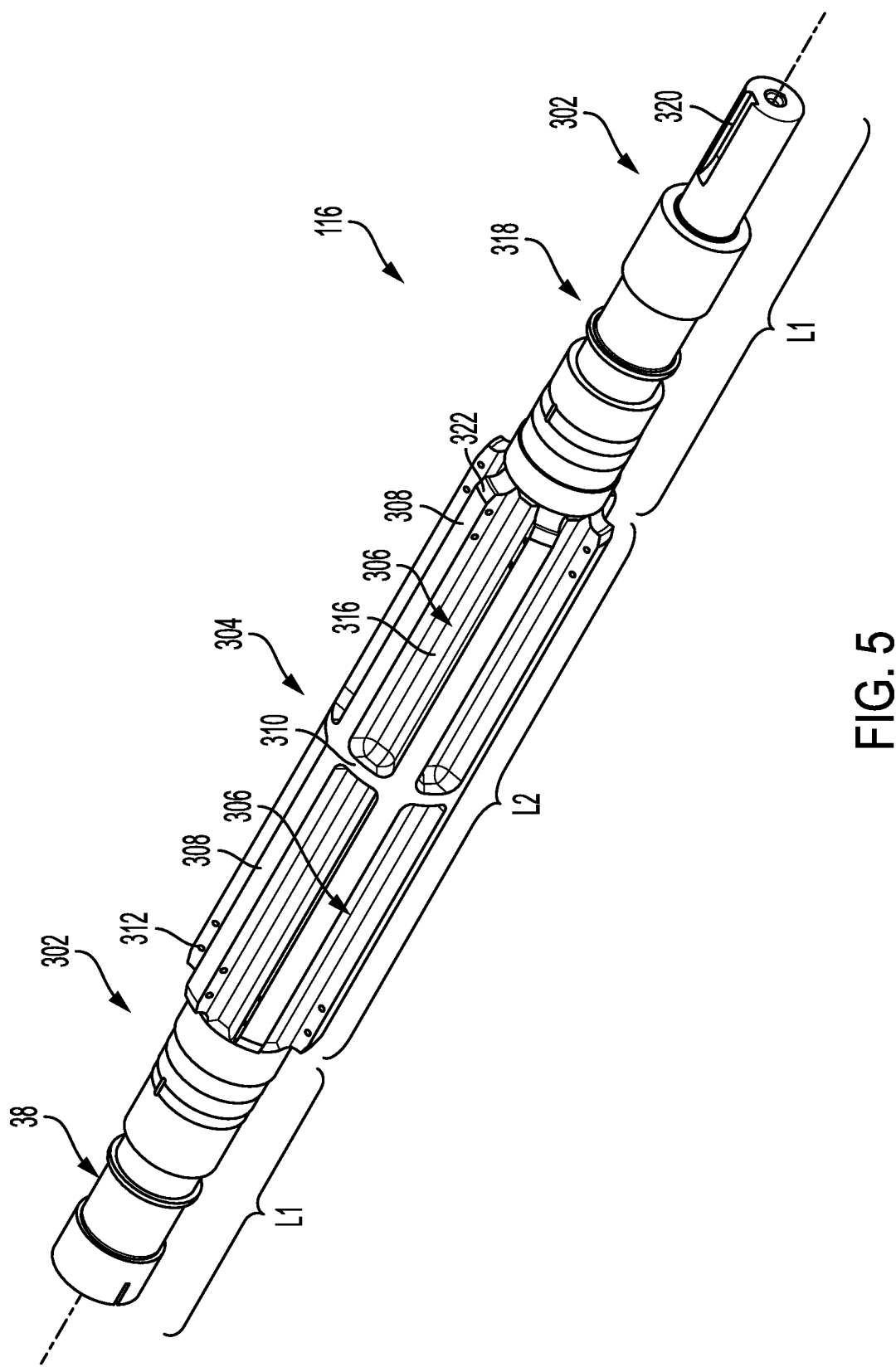
FIG. 5 is an outline view of the shaft of FIG. 3 after machining.

An outline of a preform 116' of the rotor shaft 116 is shown in FIG. 4, with a section view of the same shown in FIG. 4. An outline of the rotor shaft 116 removed from the motor 100 is shown in FIG. 5. In reference to these figures, it can be seen that the shaft preform 116', which represents a casting or forging preform for the rotor shaft 116, which has had a first set of machining operations performed thereon, is a stepped shaft that includes end portions 302 and a middle or core portion 304.

The end portions 302 have a generally cylindrical shape defined at a diameter, D1. Each end portion 302 extends axially along a length, L1, in a direction of the longitudinal axis L. The core portion 304 also has a generally cylindrical shape defined at a diameter D2, where D2 is larger than D1 (i.e. D2>D1). The core portion 304 extends along a length, L2, in a direction of the longitudinal axis L. When the preform 116' is formed, the core portion 304 may be formed as a solid cylinder (by, for example, molding, forging, sintering, and the like), or may alternatively be roughly molded to include various features. In either event, an initial machining operation may be used to define or refine features in the core portion 304, that include channels 306 cut between spider ridges 308.

Each channel 306 (six shown) is alternatingly and symmetrically disposed between adjacent pairs of spider ridges 308 around an entire periphery of the core portion 304. The channels 306 are bisected by a flange 310, which also generally bisects the shaft preform 116' in a direction along the longitudinal axis L. The flange 310 separates each of the channels 306 such that an axial length of each channel segment extends in a longitudinal direction over a distance that is less or equal to (L2)/2. A depth, H, of each channel 306 in a radial direction is greater than a ½ the difference between (D2−D1). As a consequence, an inner core 316 diameter, D3, of the core portion 304 is less than D1 (D3<D1). This means that the shaft preform 116' includes axially extending undercuts within the channels 306 along the inner core 316.

Each spider ridge 308 has a thickness, T, in a direction perpendicular and at an offset to the axis L. Edge interfaces between the spider ridges 308, radially inner portions of the channels 306 with the inner core 316, the flange 310, and the end portions 302 are radiused, chamfered or rounded to avoid stress concentration and to provide smooth transitions for air passing through the channels 306 (denoted as air channels 114 in FIG. 2). Threaded openings 312 may be formed transversely through the spider ridges 308 (shown extending tangentially and at an offset relative to the outer periphery of the core portion 304 that is disposed at the diameter D2). The threaded openings 312 can be used to attach weights (not shown) for rotatably balancing the completed and fully machined rotor shaft 116.

Subsequent machining or other forming operations can be used to create grooves 318 in the end portions 302, for example, that support features and structures that interface with the bearings 132 (FIG. 2), a key slot 320, for connecting to rotatable machinery (not shown), and end cuts 322 for facilitating insertion of other rotor components onto the core portion 304 of the rotor shaft 116, as shown in FIG. 5.

Figure 6:
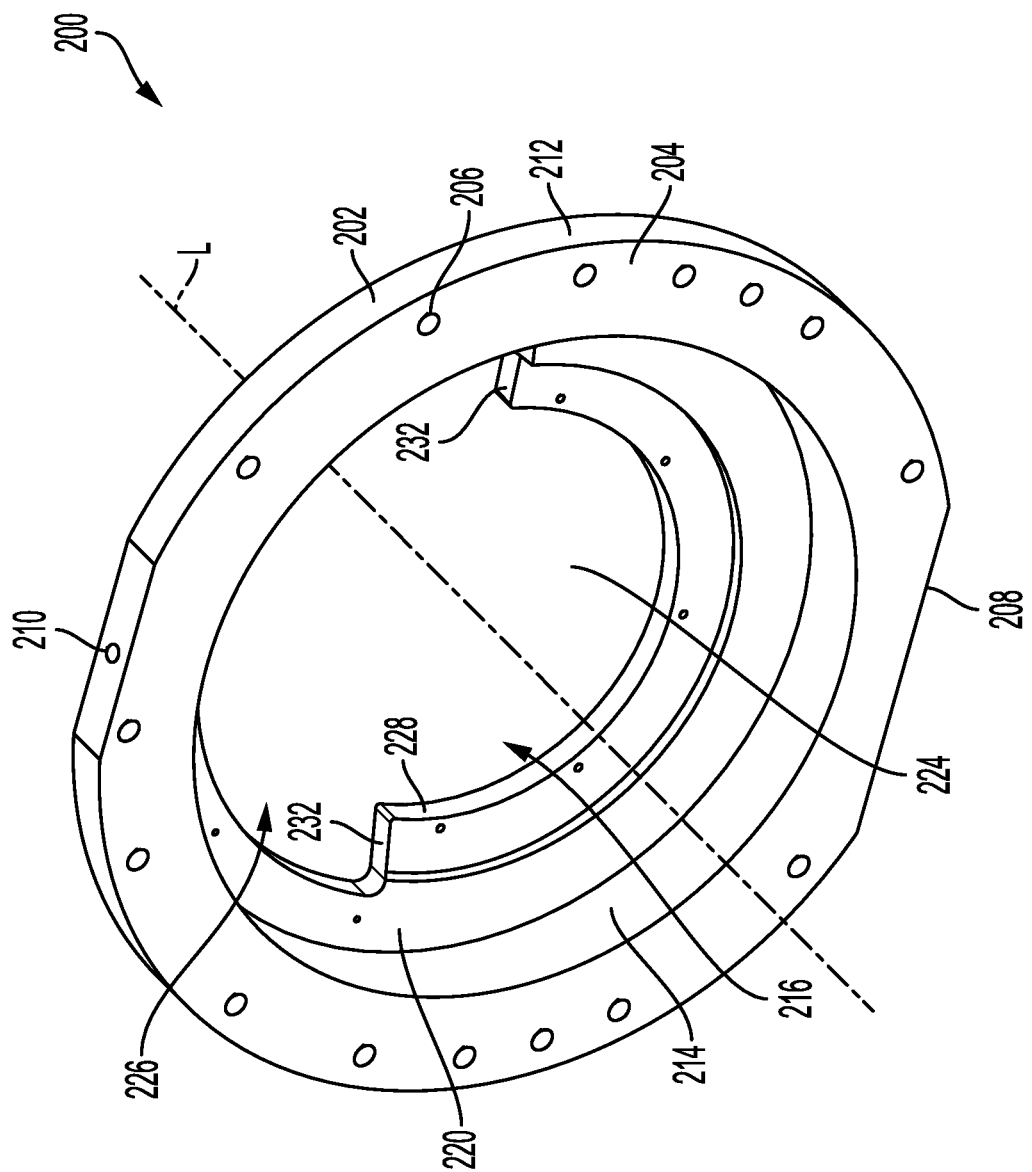
FIG. 6 is an outline view of the motor bracket.
Figure 8:
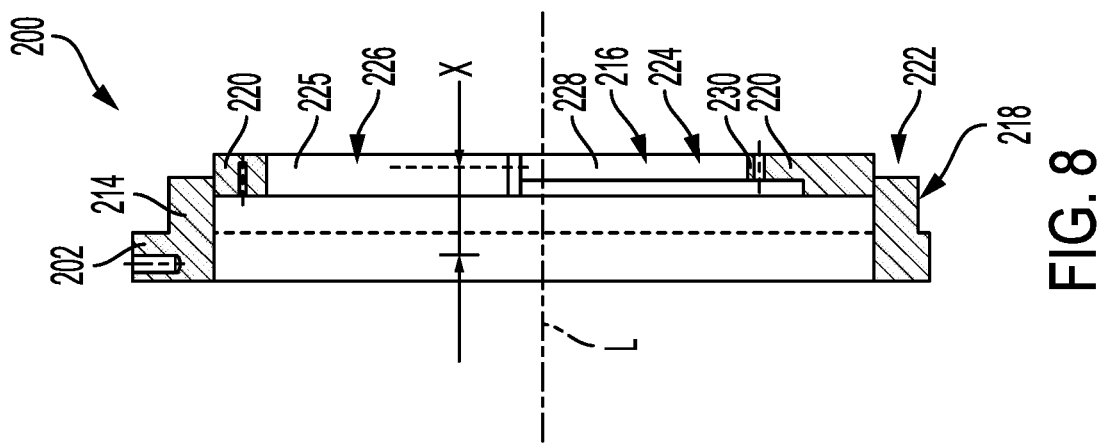
FIGS. 7 and 8 are a partial and a complete section views of the bracket of FIG. 6.
Figure 7:
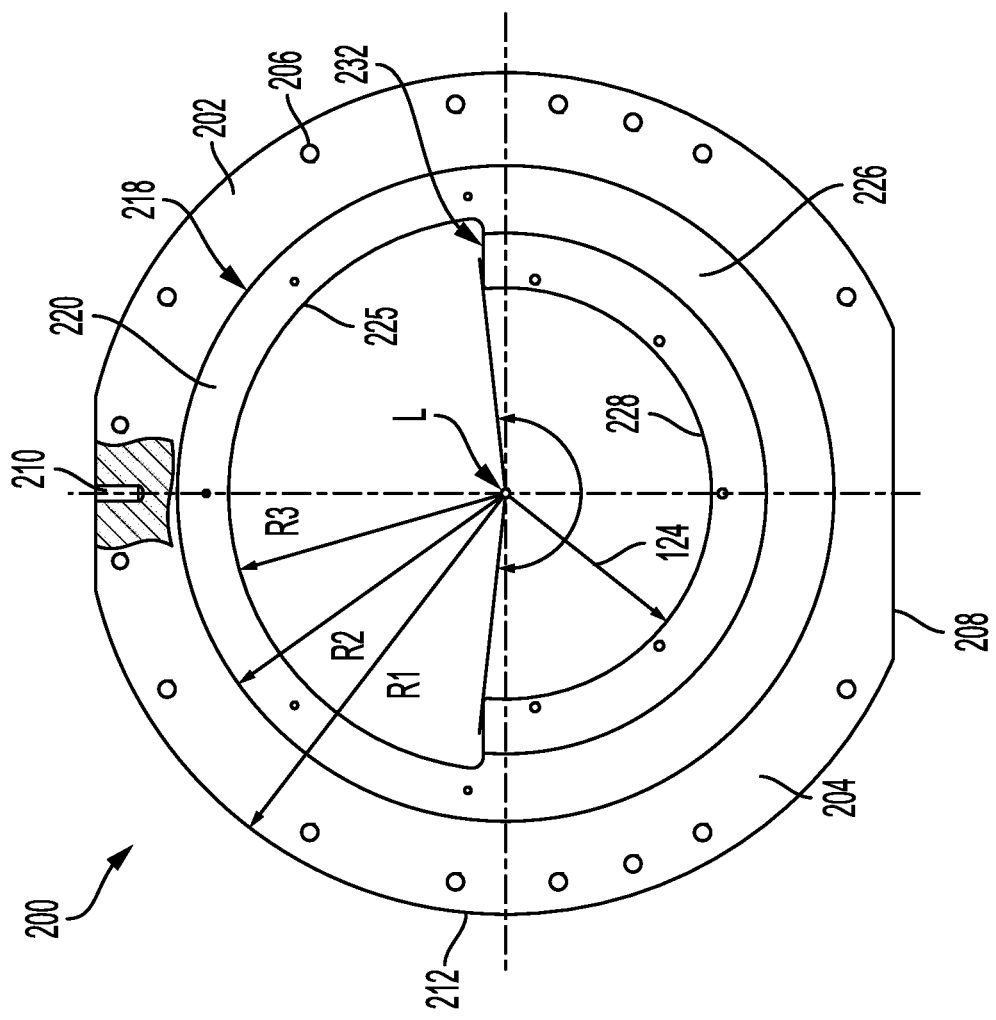

An outline view of one of the two brackets 200 that are used on the motor 100 is shown in FIG. 6 removed from the housing 102 for sake of illustration. A partial section through the bracket 200 is shown in FIG. 7, and a full section is shown in FIG. 8. In reference to these figures, the bracket 200 is made as a single metal article, for example, a casting or a fabricated piece. The bracket 200 has a generally circular shape that is attached to the housing 102 of the motor 100 (FIG. 1) and closes the end opening of the rotor cavity 134 while also supporting the bearings 132 that rotatably support the rotor shaft 116 of the rotor assembly 106. To accomplish these functions, and also to provide a stiff mounting structure for the rotor assembly 106, the bracket 200 is constructed as a frusto-conical structure, as is best seen in FIG. 8, which results from stacked annular structures that serve to mount or support the bracket and other structures.

More particularly, the bracket includes an outer ring 202. The outer ring 202 has an annular shape that includes an outer, flat, mounting flange 204 with fastener openings 206 that attaches to the housing 102 of the motor 100 (see FIG. 2) to support the bracket 200 onto the housing 102. The outer ring 202 includes a flat bottom 208, a threaded top opening 210 (for attaching a lifting eye), and an outer periphery 212 at a radius R1 that is sufficiently dimensioned to cover the end opening of the rotor cavity 134 of the motor housing 102. When installed, the ends of the rotor shaft 116 extend through a central opening 216 at a radius R2 of the outer ring 202.

A cylindrical spacer 214 is disposed on an axial end of the outer ring 202 opposite the mounting flange 204. The cylindrical spacer 214 is disposed on an inner side of the outer ring 202, and extends in a direction opposite the mounting flange 204, which means that the cylindrical spacer extends into the rotor cavity 134 when the bracket 200 is mounted onto the housing 102. The cylindrical spacer 214, as the name implies, has a generally hollow cylindrical shape that extends an end of the outer ring 202 into the rotor cavity 134. The cylindrical spacer 214 has an inner bore that, in the illustrated embodiment, is aligned with an inner bore of the outer ring 202 that forms the central opening 216 at the radius R2. An outer periphery 218 of the cylindrical spacer 214 has a smaller diameter than the outer periphery of the outer ring 202 to thus define a stepped feature. In the illustrated embodiment, the outer periphery 218 of the cylindrical spacer 214 is sized such that it fits within an inner dimension of the rotor cavity 134 of the housing 102 to permit ingress of the spacer 214 into the rotor cavity 134, as described, without interference with rotor components or the rotor shaft 116.

A bearing mounting plate 220 is disposed in the central opening 216. The bearing mounting plate 220 has an outer diameter at R2 that fits within the bore of the central opening 216, as shown in FIG. 8. The bearing mounting plate 220 is disposed at an axially offset position such that the bearing mounting plate 220, in the embodiment shown, extends further into the rotor cavity 134 than an axially distant face 222 of the cylindrical spacer 214, but in alternative embodiments the bearing mounting plate 220 may also be axially aligned with the face 222. The bearing mounting plate 220 has a generally circular shape that defines a bearing opening 224 at a defined within a surface 225 formed at a radius R3 along a semicircular area at its lower half, and an access opening 226 along a remaining semicircular area at its upper half. The access opening 226 may be closed by a cover (not shown) during operation. The bearing opening 224 includes a bearing plate 228 that has a generally semicircular shape at a radius R4 (although it may extend more than a span of 180 degrees along the bearing opening) and provides a bearing support surface 228 onto which the bearing 132 rests. As shown, R1>R2>R3>R4, but some radii can also be equal. To secure the bearing 132 onto the bearing support surface 228 threaded fasteners may be used, which engage threaded openings 230, or other mounting structures may be used. The bearing plate 228 extends along a segment of the inner surface of the bearing mounting plate 220 that extends over an area of at least 180 degrees, more or less, depending on a connection arrangement on the bearing 132, between two pads 232.

When the bracket 200 is installed in the motor 100, the bearings 132 rest on the pads 232 and are located axially by the bearing plate 228. In previous motor designs, the suspended length of the rotor shaft 116 between its corresponding bearings would include end sections, marked as "X" in FIG. 8, between the two corresponding outer rings attached to the housing. This is because previous brackets did not include a cylindrical spacer, or an axial offset to the bearing mounting plate, as is the case with the bracket 200 in accordance with the disclosure. For this reason, the distance "X" provided by the bracket 200, which decreases the suspended distance of the rotor shaft 116 by a distance of 2× (one for each bracket disposed at either end of the rotor shaft), stiffens the rotor, as described above by inherently increasing the natural frequency of the suspended rotor shaft and, thus, the rotor assembly.

As can be appreciated, the distance X, which lies along the longitudinal axis L, improves performance when minimized. The amount of the distance X for each motor will depend on the size of the motor and also the available space and clearance to rotating components within the rotor cavity 134 for any particular motor design.

Figure 9:
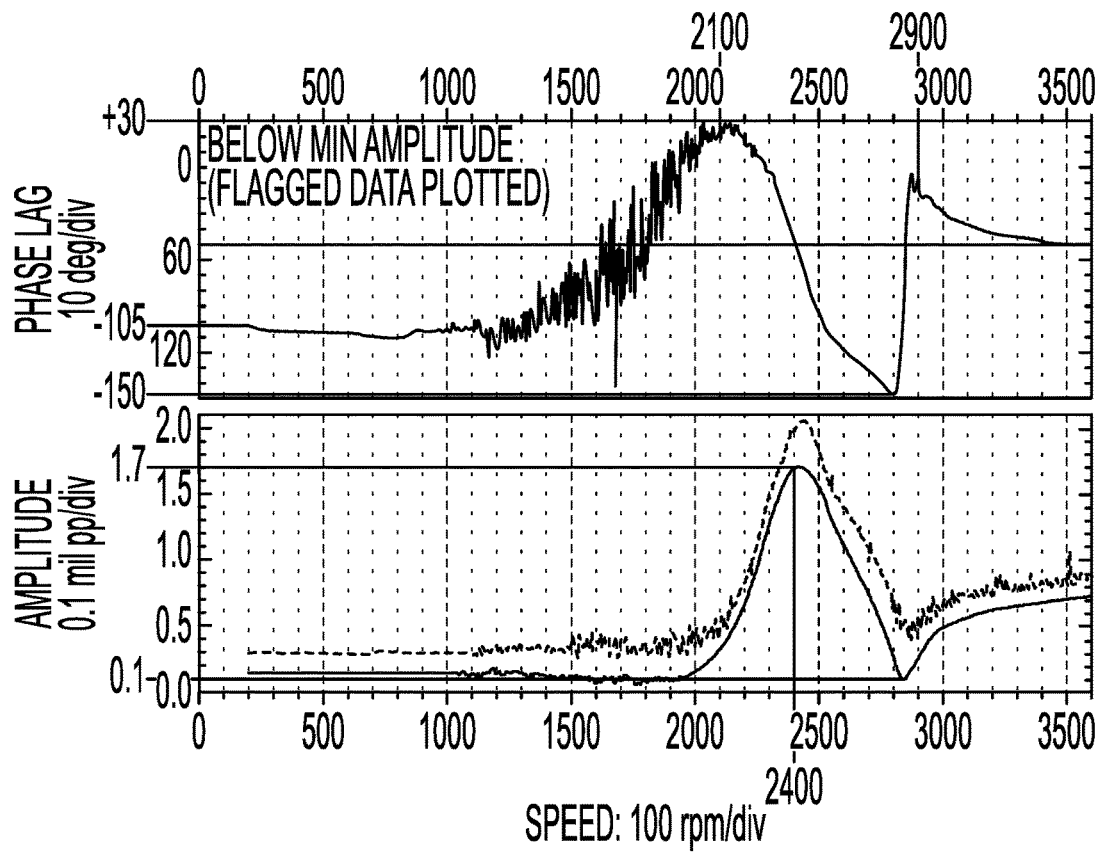
FIGS. 9 and 10 are Bode plots of rotor shaft vibration in accordance with the disclosure.
Figure 10:
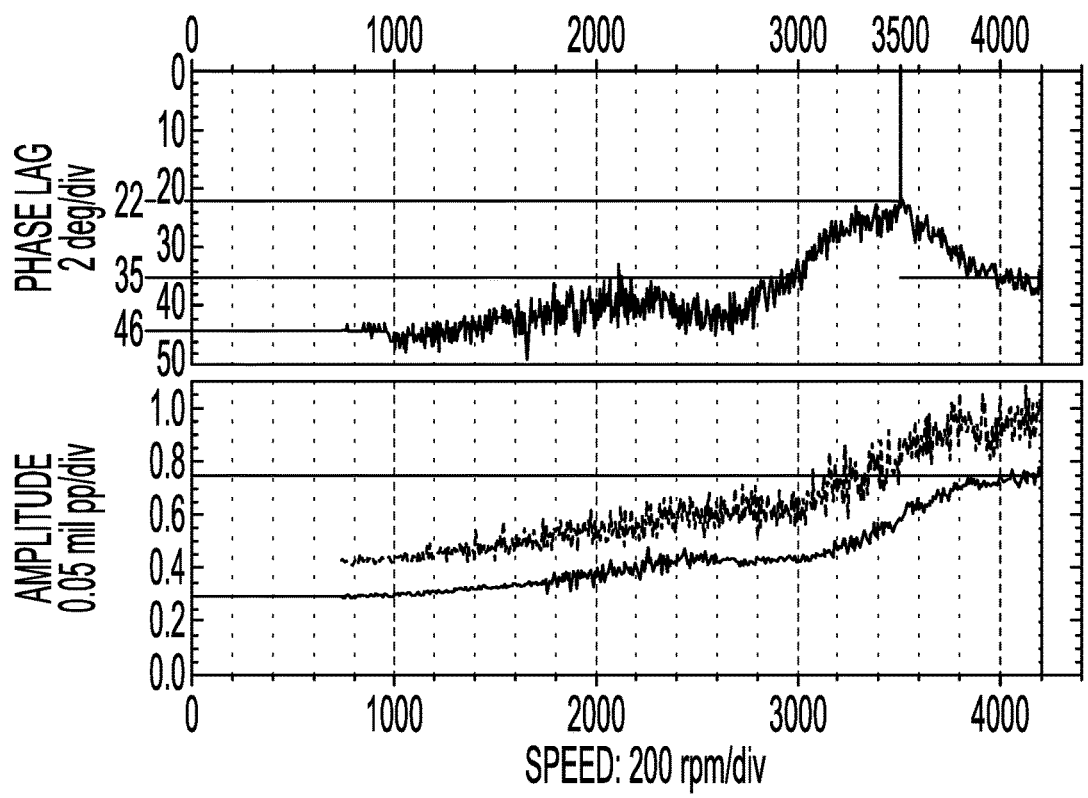

In the embodiment shown, the reduced suspended length of the rotor shaft 116 provided by the brackets 200 (one on either end), as well as the core portion 304 of the rotor shaft 116, provide a stiffening of the rotor assembly 106 that is sufficient to move the natural frequency of vibration to a rotating speed of the rotor that is above the maximum operating speed of the motor. To illustrate this improvement, two sets of bode plots are provided in FIGS. 9 and 10. Specifically, the plots illustrated in FIG. 9 show the vibration of a baseline rotor assembly on a motor without the improvements discussed herein during an unpowered coast-down or a rotor from a rotational speed of about 3600 revolutions per minute (RPM) to zero RPM. FIG. 10 shows the vibration of a motor that includes the improvements described here, i.e., a rotor assembly that includes an improved rotor shaft such as the rotor shaft 116 shown in FIG. 5, and also an improved set of brackets such as the bracket 200 shown in FIG. 7. In each set of plots, upper and lower graphs are shown.

As is typically done in Bode plots, the upper plot in each of FIGS. 9 and 10 represents the phase lag, expressed in degrees and plotted along the vertical axis, and shaft speed of rotation, expressed in RPM and plotted along the horizontal axis. The different scale between the two phase lag v. RPM graphs between the two figures is noted, with the scale in FIG. 9 being 10 deg./division and the scale in FIG. 10 being 2 deg./division along the respective axes.

The lower plot in each of FIGS. 9 and 10 represents amplitude of vibration, expressed in mils (0.001 in.) peak to peak, per division (mil pp/div.) and plotted along the vertical axis, and shaft speed of rotation, expressed in RPM and plotted along the horizontal axis. The different scale between the two amplitude graphs between the two figures is noted, with the scale in FIG. 0.2 mil pp/div. and the scale in FIG. 10 being 0.05 mil pp/div. along the respective axes.

As can be seen in the baseline case (FIG. 9), the vibration amplitude of the decelerating shaft peaks at around 2400 RPM, which is within the normal operating range of 0-3600 RPM for the motor. The maximum peak amplitude measures at around 1.6 mil pp. and is present for a range of speeds between about 2100-2900 RPM. The phase lag of the vibration reaches a maximum swing of about 180 degrees (between −150 and +30 degrees) with inflection points at about 2100, 2800 and 2900 RPM. Such vibration is quite noticeable during motor operation, and for the baseline motor a block-out speed range of 2400+/−10% would be instituted to avoid excessive noise and vibration during operation. as can be appreciated, even with the block-out range, the vibration below 2200 and above 2600 RPM is still quite noticeable.

The marked improvement in rotor stiffening, which essentially eliminates the vibration in the improved motor characterized with the plots of FIG. 10 can be readily appreciated. For the improved motor, the vibration amplitude of the decelerating shaft does not include any noticeable peaks, and smoothly reduces over the operating range of the motor from 1 mil pp. to about 0.4 mil pp. Compared to the peak of 1.6 mil pp. that was present in the baseline condition (FIG. 9), this represents a reduction in amplitude between 40-80%. The phase lag of the vibration reaches a maximum swing of about 24 degrees (between −22 and −46 degrees), as compared to 180 degrees in the baseline motor, an 87% reduction, with no sharp inflection points. Such vibration is quite low and requires no block-out speed ranges for the improved motor.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A motor, comprising:
   a housing
   a stator assembly disposed in the housing, the stator assembly defining a rotor cavity extending through the housing;
   a rotor assembly including a rotor shaft extending along a longitudinal axis;
   two brackets connected to the housing, the two brackets disposed, one each, at either end of the rotor cavity; and
   two bearings disposed, one each, on each of the two brackets, wherein the two bearings rotatably support the rotor shaft within the housing;
   wherein the rotor shaft is a stepped shaft that includes end portions disposed at either end of a core portion, the end portions being generally cylindrical at a first diameter, the core portion having a generally cylindrical shape defined at a second diameter, wherein the core portion includes channels extending in a direction parallel to the longitudinal axis, the channels extending radially at a depth into the core portion to define a core diameter, and wherein the core portion further comprises a flange that bisects the channels, the flange having an outer diameter that matches the second diameter of the core portion; and
   wherein the core diameter is less than the first diameter.

2. The motor of claim 1, wherein the core portion further comprises spider ridges disposed between the channels.

3. The motor of claim 2, further comprising at least one threaded opening formed in at least one spider ridge, the at least one threaded opening adapted to support a fastener used to connect a balancing weight onto the rotor shaft.

4. The motor of claim 1, wherein the core portion includes a plurality of channels arranged symmetrically around an entire periphery of the core portion.

5. The motor of claim 1, further comprising one or more fans disposed on the rotor shaft, the one or more fans promoting a cooling air flow that traverses the rotor assembly at least in part through the channels formed in the core portion.

6. The motor of claim 1, wherein each of the two brackets has a frusto-conical shape defined by concentrically disposed circular plates that are placed in spaced relation along the longitudinal axis.

7. The motor of claim 1, wherein each of the two brackets includes:
   an outer ring having an annular shape that includes an outer, flat, mounting flange connected to the housing and a central opening, through which at least a portion of the rotor shaft extends;
   a cylindrical spacer disposed on an axial end of the outer ring opposite the mounting flange, the cylindrical spacer configured to extend into the rotor cavity of the housing, wherein the central opening of the outer ring extends through the cylindrical spacer; and
   a bearing mounting plate disposed adjacent an end of the cylindrical spacer opposite the mounting flange such that the bearing mounting plate is disposed within the rotor cavity, the bearing mounting plate defining a bearing opening into which a respective one of the two bearings is disposed.

8. The motor of claim 7, wherein each of the two brackets further includes a bearing plate disposed in the bearing opening, the bearing plate having a generally semi-circular shape and defining a bearing support surface onto which the one of the two bearings rests.

9. The motor of claim 8, wherein the bearing plate extends along a segment of an inner surface of the bearing mounting plate that extends over an area of at least 180 degrees between two pads.

10. A motor, comprising:
    a housing
    a stator assembly disposed in the housing, the stator assembly defining a rotor cavity extending through the housing;
    a rotor assembly including a rotor shaft extending along a longitudinal axis;
    two brackets connected to the housing, the two brackets disposed, one each, at either end of the rotor cavity; and
    two bearings disposed, one each, on each of the two brackets, wherein the two bearings rotatably support the rotor shaft within the housing;
    wherein each of the two brackets has a frusto-conical shape defined by concentrically disposed circular plates that are placed in spaced relation along the longitudinal axis;
    wherein each of the two brackets includes:
    an outer ring having an annular shape that includes an outer, flat, mounting flange connected to the housing and a central opening, through which at least a portion of the rotor shaft extends;
    a cylindrical spacer disposed on an axial end of the outer ring opposite the mounting flange, the cylindrical spacer configured to extend into the rotor cavity of the housing, wherein the central opening of the outer ring extends through the cylindrical spacer; and
    a bearing mounting plate disposed adjacent an end of the cylindrical spacer opposite the mounting flange such that the bearing mounting plate is disposed within the rotor cavity, the bearing mounting plate defining a bearing opening into which a respective one of the two bearings is disposed.

11. The motor of claim 10, wherein each of the two brackets further includes a bearing plate disposed in the bearing opening, the bearing plate having a generally semi-circular shape and defining a bearing support surface onto which the one of the two bearings rests.

12. The motor of claim 11, wherein the bearing plate extends along a segment of an inner surface of the bearing mounting plate that extends over an area of at least 180 degrees between two pads.

13. The motor of claim 10, wherein the rotor shaft is a stepped shaft that includes end portions disposed at either end of a core portion, the end portions being generally cylindrical at a first diameter, the core portion having a generally cylindrical shape defined at a second diameter, wherein the core portion includes channels extending in a direction parallel to the longitudinal axis, the channels extending radially at a depth into the core portion to define a core diameter; and wherein the core diameter is less than the first diameter.

14. The motor of claim 13, wherein the core portion further comprises spider ridges disposed between the channels.

15. The motor of claim 14, further comprising at least one threaded opening formed in at least one spider ridge, the at least one threaded opening adapted to support a fastener used to connect a balancing weight onto the rotor shaft.

16. The motor of claim 13, wherein the core portion includes a plurality of channels arranged symmetrically around an entire periphery of the core portion.

17. The motor of claim 13, further comprising one or more fans disposed on the rotor shaft, the one or more fans promoting a cooling air flow that traverses the rotor assembly at least in part through the channels formed in the core portion.

18. The motor of claim 13, wherein the core portion further comprises a flange that bisects the channels, the flange having an outer diameter that matches the second diameter of the core portion.

* * * * *